United States Patent
Hemani et al.

(10) Patent No.: US 10,347,052 B2
(45) Date of Patent: Jul. 9, 2019

(54) COLOR-BASED GEOMETRIC FEATURE ENHANCEMENT FOR 3D MODELS

(71) Applicant: ADOBE INC., San Jose, CA (US)

(72) Inventors: Mayur Hemani, Delhi (IN); Naveen Prakash Goel, Noida (IN); Kedar Vijay Bodas, Noida (IN); Amit Mittal, Noida (IN)

(73) Assignee: ADOBE INC., San Jose, CA (US)

( * ) Notice: Subject to any disclaimer, the term of this patent is extended or adjusted under 35 U.S.C. 154(b) by 122 days.

(21) Appl. No.: 14/944,658

(22) Filed: Nov. 18, 2015

(65) Prior Publication Data
US 2017/0140512 A1    May 18, 2017

(51) Int. Cl.
*G06T 19/20*      (2011.01)

(52) U.S. Cl.
CPC .......... *G06T 19/20* (2013.01); *G06T 2210/16* (2013.01); *G06T 2219/2021* (2013.01)

(58) Field of Classification Search
CPC ..... G06T 7/0085; G06T 7/408; G06T 17/205; G06T 5/002; G06T 2207/10024; G06T 2200/04; G06K 9/2081
See application file for complete search history.

(56) References Cited

U.S. PATENT DOCUMENTS

| | | | | | |
|---|---|---|---|---|---|
| 5,329,381 | A | * | 7/1994 | Payne | H04N 1/32561 358/3.26 |
| 5,644,386 | A | * | 7/1997 | Jenkins | G06K 9/00201 244/3.16 |
| 6,714,195 | B1 | * | 3/2004 | Ezra | G06T 15/04 345/423 |
| 6,985,620 | B2 | * | 1/2006 | Sawhney | G01S 5/163 345/419 |
| 7,280,105 | B2 | * | 10/2007 | Cowperthwaite | G06T 15/40 345/418 |
| 2004/0196294 | A1 | * | 10/2004 | Hong | G06T 15/04 345/582 |
| 2008/0118118 | A1 | * | 5/2008 | Berger | G06K 9/342 382/128 |
| 2008/0166069 | A1 | * | 7/2008 | Lin | G06T 3/40 382/302 |
| 2011/0025690 | A1 | * | 2/2011 | Tzur | G06T 15/04 345/423 |
| 2015/0029198 | A1 | * | 1/2015 | Sumner | G06T 13/20 345/474 |

* cited by examiner

*Primary Examiner* — Chan S Park
*Assistant Examiner* — Elisa M Rice
(74) *Attorney, Agent, or Firm* — Shook, Hardy & Bacon, L.L.P.

(57) ABSTRACT

Local color information in a 3D mesh is used to enhance fine geometric features such as those in embroidered clothes for 3D printing. In some implementations, vertex color information is used to detect edges and to enhance geometry. In one embodiment, a 3D model is projected into a 2D space to obtain a 2D image, so that pixels that lie on edges in the 2D image can be detected. Further, such edge information is propagated back to the 3D model to enhance the geometry of the 3D model. Other embodiments may be described and/or claimed.

20 Claims, 6 Drawing Sheets

COLOR-BASED GEOMETRIC FEATURE ENHANCEMENT FOR 3D MODELS

BACKGROUND

A three-dimensional (3D) scanner is a device that can analyze and collect data of shape and/or appearance of an object or environment. 3D models can then be constructed based on data collected by the 3D scanner. In 3D scanning, data of geometry (e.g., vertex position) and color (e.g., per-vertex color) are generally captured. Such data can then be used in building a 3D polygonal mesh. Typically, when 3D scanning a person, salient features such as limbs or other body parts are captured in the geometry data. On the contrary, fine details such as embroidered designs and jewelry details usually do not appear in geometry due to the low spatial resolution of most consumer-oriented 3D sensors or 3D cameras. As a result, those fine details, e.g., the embroidery on clothes, which would otherwise have been creased or raised in reality, appear flat when the 3D model of the person is 3D printed, e.g., using a 3D printer.

Currently, the issue of missing fine details, e.g., in 3D printing, may be partially rectified by manually 3D sculpting all such features. In 3D sculpting, an author may push, pull, smooth, grab, pinch, or otherwise manipulate a 3D object using 3D sculpting software tools. However, 3D sculpting is not only tedious with large dense meshes, as is the case for 3D scan output, but may result in misalignment of edges in the color information and the geometry, which usually become evident after printing.

SUMMARY

Embodiments of the present disclosure relate to color-based geometric feature enhancement for 3D models. Various methods, systems, and computer-readable media are disclosed for employing vertex color information in a 3D mesh for enhancing fine geometric features, such as those in embroidered clothes for 3D printing. In some implementations, local color information is used to detect edges in a 2D image and to enhance geometry in a corresponding 3D model. Specifically, a 3D model is projected into a 2D space to obtain a 2D image, and edges of fine features in the 2D image are detected based on local color information. The edge information is then propagated back to the 3D model to enhance the geometry of those corresponding fine features in the 3D model.

Advantageously, a user does not have to make up missing fine details manually with 3D sculpting tools. Instead, the user just selects a region of a 3D mesh, and the fine geometric features are enhanced in the selected region based on techniques described by this disclosure. Such color-based geometric feature enhancement methods or systems work with dense or sparse meshes. Additionally, such methods or systems preserve the existing features that are located on existing ridges or creases of the 3D mesh.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, modules, blocks, steps, etc., similar to the ones described in this document, in conjunction with other present or future technologies.

3D scanners can analyze and collect data of shape and/or appearance of an object or environment. Data captured by 3D scanners, e.g., data of geometry (e.g., vertex position) and color (e.g., per-vertex color), can then be used in 3D modeling, which includes a process to develop a mesh representation of the 3D surface of the object or environment.

The process of 3D modeling produces 3D models. A 3D mesh is part of a 3D model. A 3D model may include more than one mesh, additionally may include other elements, e.g., animation information or texture information. A 3D mesh defines the vertices of an object, and typically stores the vertices in an order as to imply their connectivity, like every three vertices for a triangle.

A typical means of creating a 3D model is to take a simple object, called a primitive, and extend or "grow" it into a shape that can be refined and detailed. Primitives can be anything from a single point (e.g., a vertex), a two-dimensional (2D) line (e.g., an edge), a curve (e.g., a spline), to 3D objects (e.g., faces or polygons). Polygonal meshes are common discrete digital approximations of otherwise continuous surfaces of 3D models. A polygon mesh is formed by connecting points in 3D space, called vertices, using line segments.

A 3D model, e.g., a polygon mesh, can be used in computer simulation of physical reality. In some instance, a 3D model can be rendered, via a 3D rendering process, to become a 2D image. In other instances, a 3D model can be printed, via a 3D printing process, to a physical 3D object.

In 3D printing, successive layers of material are laid down in additive processes based on 3D models. Therefore, 3D printing is also known as additive manufacturing.

As discussed previously, in 3D scanning, fine features of the scanned object usually are not captured in geometry data due to the low spatial resolution of most 3D sensors or 3D cameras. However, the shape and appearance of these fine details are captured in the vertex color information because data of geometry (e.g., vertex position) and color (e.g., per-vertex color) are generally captured in 3D scanning. Further, such fine features, e.g., the embroidery, can be related to edges in the 2D projection of the 3D model, e.g., edges of fine features in the 2D image can be detected based on local color information. Therefore, vertex color information in a 3D mesh is used in various embodiments herein to detect edges in the 2D projection of a 3D model and subsequently to enhance fine geometric features in the 3D model based on the detected edge information.

At a high level, vertex color information is employed in various embodiments for enhancing geometry of a 3D mesh. In some embodiments, a 3D model is projected into a 2D space to obtain a 2D image. In some implementations, perspective projection is used. In some implementations, parallel projection is used. In some embodiments, a 2D image is first constructed from the vertices of a 3D mesh selected by a user, e.g., by using a brush.

Discontinuities in the image brightness caused by fine features can be captured in the vertex color information in a 3D model during, e.g., the 3D scanning process. When the 3D model is projected into a 2D image, discontinuities in the image brightness caused by fine features are revealed on the 2D image. At a high level, edge detection uses mathematical methods to identify pixels in the 2D image where the image brightness has discontinuities. Thus, pixels that lie on edges in the 2D image can be detected. In some embodiments, a second order edge detection (e.g., Laplacian) is applied to the image to detect pixels that lie on edges. Pixels that lie on edges can be correlated to those fine features. In some embodiments, the 2D image is blurred to reduce noise, such as to mitigate the interference of minor artifacts before the edge detection is applied.

The edge information based on such identified pixels is then propagated back to enhance the geometry of the 3D model, e.g., for those vertices correlating to those fine features. For post-processing an edge to obtain the affected vertices in the 3D model, the 3D coordinates of those points in the 3D model corresponding to the pixels associated with the edge are first identified. Then, neighboring vertices within a radius of respective points in the 3D model are further identified. Subsequently, graded displacement values can be assigned to at least some of those neighboring vertices to enhance the geometry of the 3D model.

In some embodiments, the vertices that are already sitting on relief features are filtered out to avoid distortion on existing relief features. An existing relief feature already gives the impression that the relief feature has been raised above the background plane, e.g., based on the use of shading, color, etc. By way of the example, the parts of the mesh that are on existing ridges or creases shall be preserved.

In one embodiment, a penalization process is used to identify those vertices that are sitting on relief features on the part of the 3D model and heavily penalize the potential changes to those vertices that are located on an existing relief feature. By way of example, the displacement value to a vertex is correlated to the angle of the surface normals of incident faces for the vertex. Generally, the angle of the normals of incident faces for the vertex reflects the likelihood whether the vertex is located on an existing relief feature. Therefore, the greater the angle of the normals of incident faces for the vertex, the harder would the displacement value be penalized. As a result, the vertices associated with a relief feature may not be displaced, so that the original relief feature is preserved.

Figure 1:
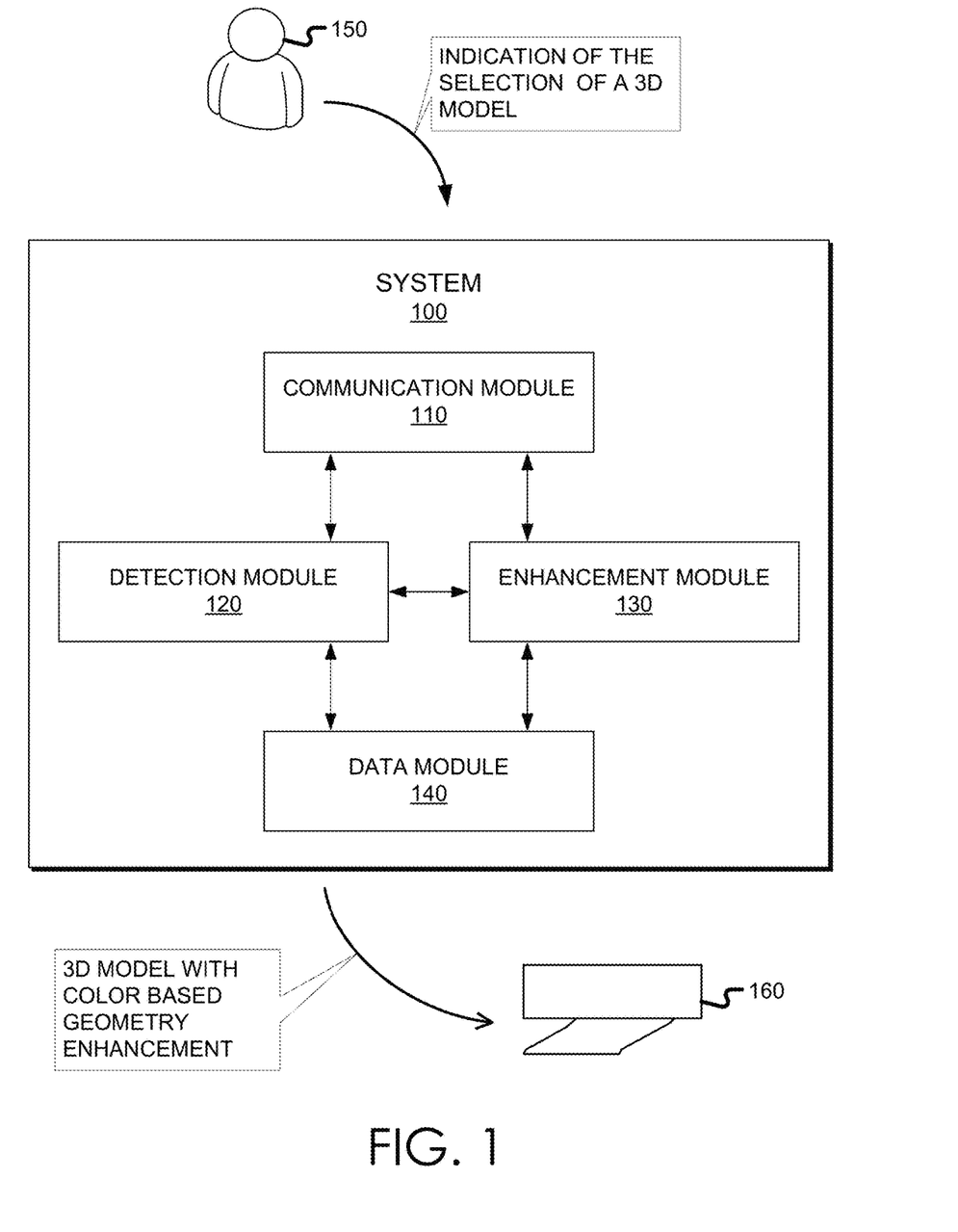
FIG. 1 is a schematic diagram illustrating an example implementation of a system for color-based geometric feature enhancement for 3D models, incorporating aspects of the present disclosure, in accordance with various embodiments.

Referring now to FIG. 1, a schematic diagram illustrates an example system 100 for color-based geometric feature enhancement for 3D models in accordance with various embodiments. As illustrated in FIG. 1, system 100 includes communication module 110, detection module 120, enhancement module 130, and data module 140, operatively coupled with each other, to detect vertex color information associated with edges and employ the edge information for enhancing geometry of a 3D mesh.

Figure 6:
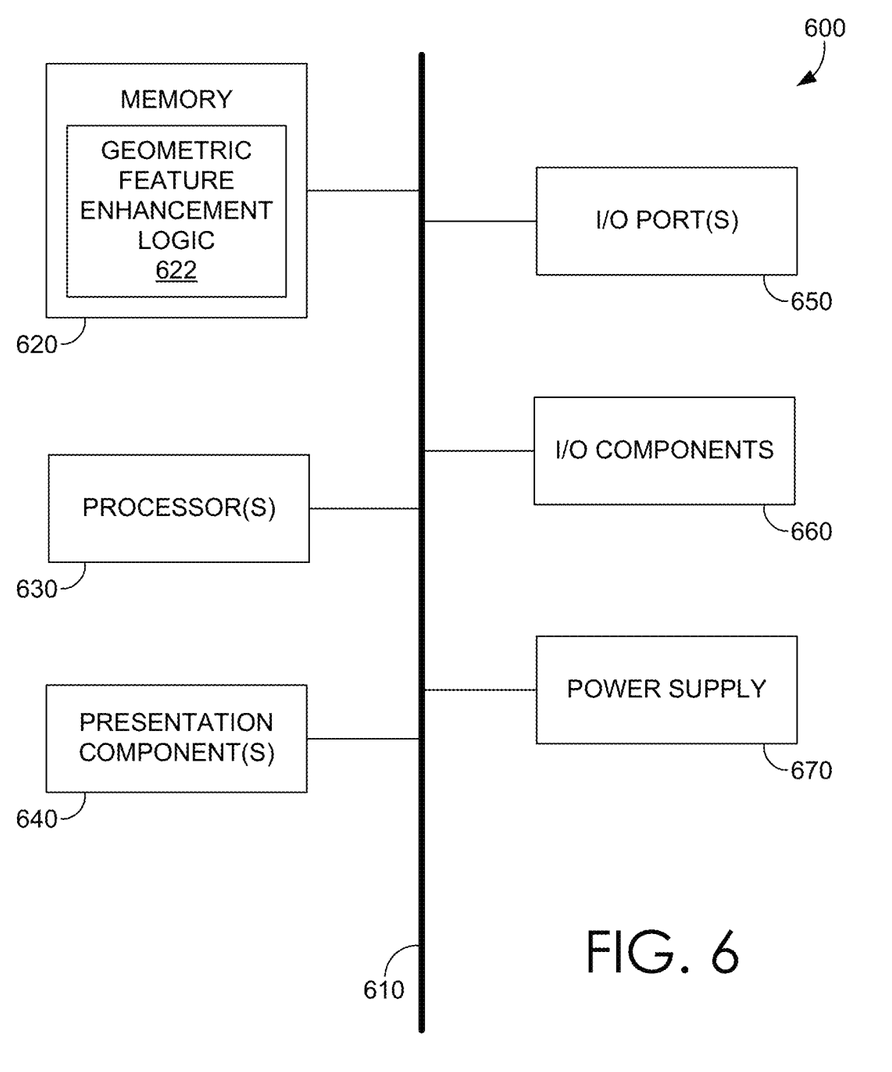
FIG. 6 illustrates an example computing device suitable for practicing the disclosed embodiments, in accordance with various embodiments.

System 100 may include a special-purpose computing device, such as computing device 600 in FIG. 6, to enhance geometry of a 3D mesh. Generally, a computing device refers to any computing or other electronic equipment that executes instructions and includes any type of processor-based equipment that operates an operating system or otherwise executes instructions. A computing device will typically include at least a processor that executes program instructions and may include external or internal components such as a mouse, a CD-ROM, DVD, a keyboard, a display, or other input or output equipment. Examples of computing devices are personal computers, digital assistants, personal digital assistants, cellular phones, mobile phones, smartphones, pagers, digital tables, laptop computers, tablet computers, Internet appliances, other processor-based devices, and television viewing devices. A computing device is to be used as a special-purpose computing device to provide specific functionality offered by applications and modules, such as to enhance geometric features for 3D models or to facilitate 3D printing thereinafter.

In operation, and at a high level, system 100 receives a request for geometric feature enhancement for a 3D model from user 150 via communication module 110. As an example, the request may include an indication of the complete 3D mesh or a part of the 3D mesh selected by a user. In response, detection module 120 retrieves the complete 3D mesh or the part of the 3D mesh indicated at the request, e.g., via data module 140. Further, detection module 120 projects the complete 3D mesh or the selected part of the 3D mesh into a 2D space and constructs a corresponding 2D image, e.g., using perspective projection technologies. In some embodiments, detection module 120 detects edges of fine features, such as embroidered designs on a cloth, e.g., based on a second-order edge detection process, such as Laplacian. Further, detection module 120 obtains the affected vertices in the 3D model associated with such detected edges in the 2D image, e.g., by post-processing the edges to obtain the affected vertices.

Thereafter, enhancement module 130 enhances those affected vertices to produce enhanced geometry of the 3D mesh. In some embodiments, the affected vertices are enhanced in a graded manner such that vertices are enhanced in various degrees, e.g., with different displacement values. Meanwhile, during such enhancement operation, enhancement module 130 mitigates impact to those vertices located on existing relief features, so that the existing features are not distorted. Finally, the 3D model with color-based geometry enhancements may be sent to 3D printer 160, where 3D printer 160 lays down successive layers of material to building a physical 3D object with fine geometric features, such as those in embroidered clothes, in its 3D printing process.

As mentioned, system 100 includes communication module 110, detection module 120, enhancement module 130, and data module 140, although various implementations are contemplated and suitable for carrying out aspects of the present invention. The communication module 110 generally enables system 100 to communicate with various users or other devices, which may generate inputs for selecting a part of the 3D mesh.

In some embodiments, a user uses one or more input methods, e.g., based on keyboard strokes, mouse movement, touchpad sensors, digital pen movement, voice input, etc., to generate an indication of the selection of a 3D model or at least a part of the 3D model. As an example, user 150 selects parts of the 3D model (e.g., a region of vertices) using a mouse, and submits such selection as input to communication module 110. Then, system 100 determines areas of edges in a 2D image and enhances their related geometric features in the 3D model. Such geometry enhancement may be limited to the parts of the 3D model submitted to system 100. In other embodiments, user 150 applies a digital tool, e.g., a sculpting brush or a digital touch-pen, along a certain embroidered design, which continuously generates indications of the parts of the 3D model that are being selected by user 150. In this case, system 100 continuously enhances parts of the 3D model corresponding to the design or feature traced by the digital tool. Yet in other embodiments, user 150 simply provides voice commands to select a part of the 3D model, and the selected part of the 3D model is subject to the color-based geometric feature enhancement process.

System 100 may receive similar requests for geometric feature enhancement from another computing device (not shown) or other software applications. By way of example, another computing device or a software application may transmit a 3D model to system 100, and system 100 can then apply color-based geometric feature enhancement to the 3D model. Optionally, system 100 may send back the enhanced 3D model to the requesting device or application, e.g., for 3D printing or other usages.

Communication module 110 may receive requests for geometric feature enhancement on 3D models, including indications of various selections on 3D models, via, e.g., public and/or private networks, such as, but not limited to, LANs, WANs, or the Internet. In some embodiments, these wireless networks may include one or more WPANs, WLANs, WMANs, or WWANs. In some embodiments, these wireless networks may include cellular networks, for example, Wideband Code Division Multiple Access (WCDMA), Global System for Mobile Communications (GSM), Long Term Evolution (LTE), and the like.

In some embodiments, data module 140 already has the 3D models to be processed in system 100. In other embodiments, data module 140 receives and stores 3D models, e.g., from another computing device. In various embodiments, data module 140 can store temporary or permanent copies of intermittent or final products from detection module 120 or enhancement module 130, e.g., 2D images projected from 3D models or vertex information for geometry enhancement.

Detection module 120 projects the selected region of the 3D model or the entire 3D model into a 2D space to form a 2D image and detects pixels associated with an edge in the image. At a high level, detection module 120 identifies pixels in the 2D image where the image brightness changes sharply or has discontinuities. In some embodiments, detection module 120 evaluates and determines whether an edge strength value of a pixel is greater than an edge strength threshold. The edge strength threshold may be predetermined or selected based on the 3D model type. The edge strength threshold may be dynamically determined based on the general image brightness of the image or the relative image brightness of a localized portion of the image. Pixels with edge strength value greater than the edge strength threshold are deemed by detection module 120 as pixels forming an edge, which refers to the pixels at which image brightness changes sharply. In some configurations, detection module 120 organizes an edge into a set of curved line segments so that the slope of a curved line segment can be different at each point along the line.

Enhancement module 130 enhances geometric contrast of those vertices on the region of the 3D model associated with the edge detected by detection module 120 in the 2D image. In some embodiments, enhancement module 130 obtains 3D coordinates of at least one point in the 3D model corresponding to the pixel associated with the edge. Enhancement module 130 also identifies neighboring vertices within a radius of the point in the 3D model. Further, enhancement module 130 assigns graded displacement values to identified neighboring vertices. Enhancement module 130 may assign the graded displacement value to a particular vertex based on a positive correlation between the displacement value and the edge strength value of the original pixel in the 2D image. On the other hand, enhancement module 130 may also assign the graded displacement value to a particular vertex based on a negative correlation between the displacement value and a distance between the vertex and the point in the 3D model. Once the displacement value of a vertex is determined, enhancement module 130 displaces the vertex along the normal of the vertex based on the displacement value.

Additionally, enhancement module 130 further identifies relief features (e.g., ridges or creases) on the region of the 3D model. An existing relief feature already gives the impression that the relief feature has been raised above the background plane, e.g., based on the use of shading, color, etc. In some embodiments, enhancement module 130 heavily penalizes the displacement values for those vertices already located on the relief feature, so that the original relief feature is not distorted.

In various embodiments, system 100 may be implemented differently than depicted in FIG. 1. As an example, detection module 120 can be combined with enhancement module 130 to form a comprehensive module to enhance geometric features for 3D models. In some embodiments, components depicted in FIG. 1 can have a direct or indirect connection not shown in FIG. 1. In some embodiments, some of the components depicted in FIG. 1 may be divided into multiple modules. As an example, enhancement module 130 may be divided into three modules, e.g., the first to identify vertices to be enhanced, the second to determine how to enhance, and the third to conduct the enhancement. Further, one or more components of system 100 may be located across any number of different devices or networks. As an example, data module 140 may be implemented as an integrated subsystem of a data server (not shown) rather than located in system 100.

Advantageously, without resorting to the tedious 3D sculpting process, e.g., to trace a design feature, a user simply selects a region of a 3D mesh, and the fine geometric features are enhanced in the selected region based on system 100. Alternatively, the user can use a brush with reasonable leeway in tracing the fine detail region and further enhance the fine geometric features in the traced path based on system 100. This alternative embodiment may be easy and quick for a user to improve details on a 3D model selectively.

Color-based geometric feature enhancement systems in accordance with embodiments described herein work with dense or sparse meshes. 3D scan output is usually a dense mesh with sufficient vertices to work with, e.g., by enhancement module 130. For sparse mesh, enhancement module 130 may increase the density of the parts that are affected before conducting such geometric feature enhancement.

Additionally, traditional sculpting tools affect all the vertices that come into its context or selection purview, regardless of whether any vertices are located in an existing relief feature. Thus, traditional sculpting tools may introduce distortions to the existing relief feature, e.g., misalignment of relief features. However, system 100 preserves the existing relief features on the 3D mesh. By way of the example, the parts of the mesh that are on ridges or creases are not affected. For instance, enhancement module 130 can automatically detect these relief features and avoid or mitigate any transformation on the vertices associated with these relief features.

Figure 2:
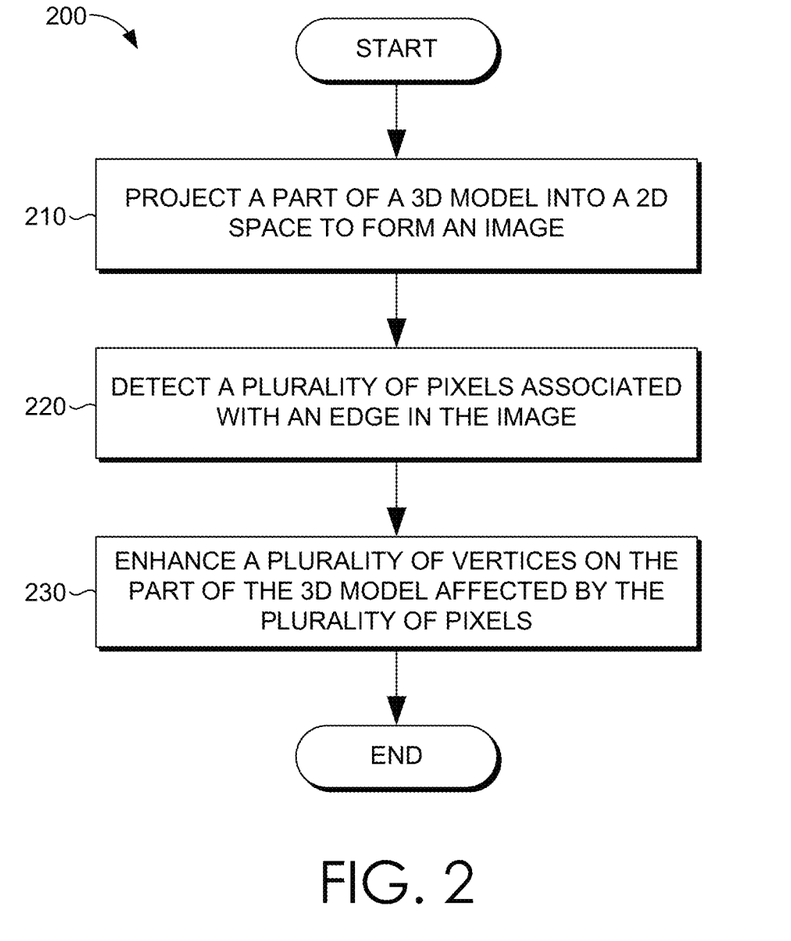
FIG. 2 is a flow diagram of an example process of color-based geometric feature enhancement, which may be practiced by an example apparatus, incorporating aspects of the present disclosure, in accordance with various embodiments.

FIG. 2 provides a flow diagram of an example process 200 for color-based geometric feature enhancement for 3D models, which may be practiced by an example apparatus in accordance with various embodiments. Process 200 may be performed by processing logic that comprises hardware (e.g., circuitry, dedicated logic, programmable logic, microcode, etc.), software (e.g., instructions run on a processing device to perform hardware simulation), or a combination thereof. By way of example, geometric feature enhancement logic 622 is one of such processing logic. Such processing logic is to be configured to perform color-based geometric feature enhancement for 3D models. As such, process 200 may be performed by a computing device, e.g., system 100, to implement one or more embodiments of the present disclosure. In various embodiments, process 200 can have fewer or additional operations, or perform some of the operations in different orders.

In various embodiments, process 200 starts with input of vertices (S) in the selected part of a 3D mesh, and assumes a k-dimensional tree (kd-tree T, where k=3) of all the vertices in the mesh, where the kd-tree (T) is a space-partitioning data structure for organizing points in a 3D space.

Figure 3:
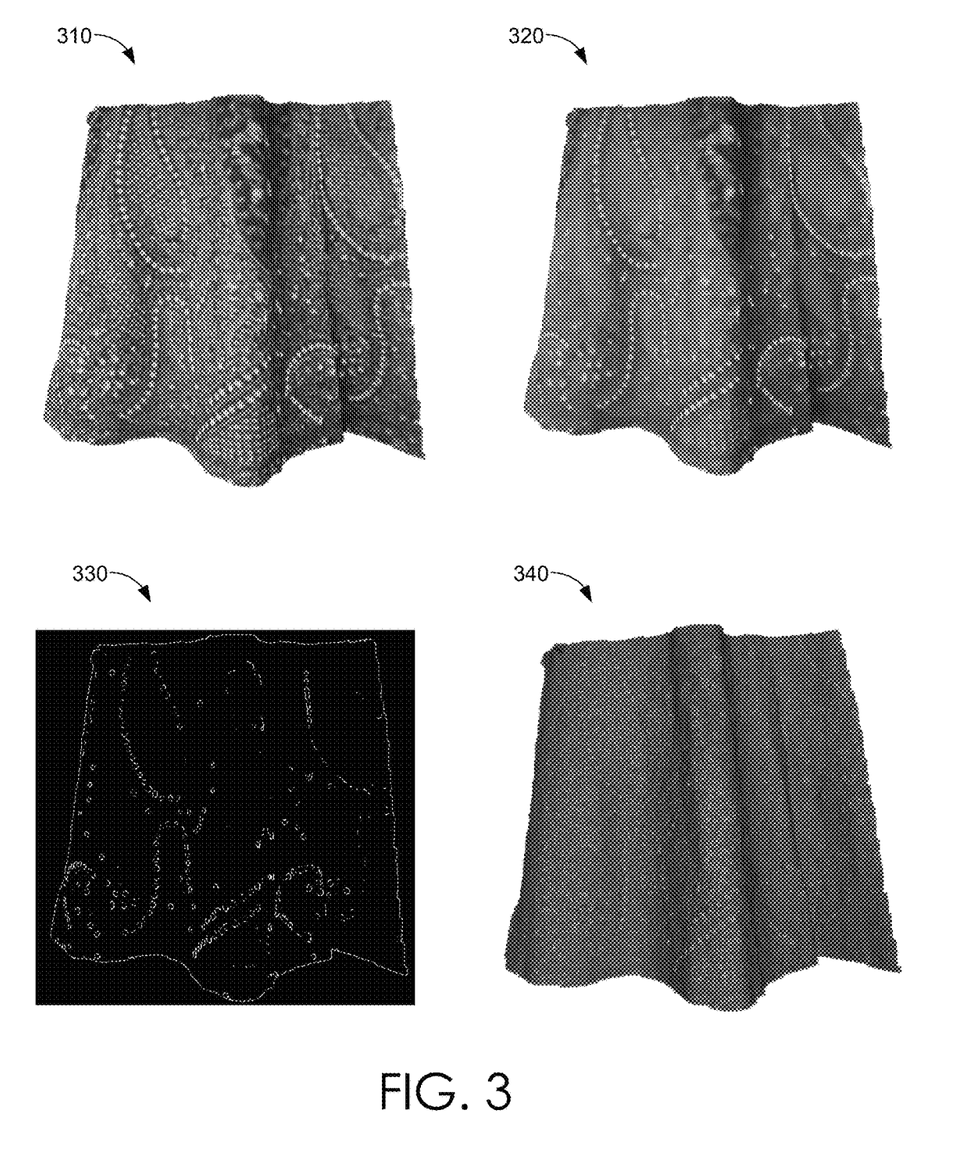
FIG. 3 depicts illustrative images presented at different stages of an example process of color-based geometric feature enhancement, in accordance with various embodiments of the present disclosure.

At block 210, the selected part of a 3D mesh is projected into a 2D space to form a 2D image, e.g., by detection module 120 of FIG. 1. A shaded 3D object is flattened so that it can be displayed in only two dimensions, and 3D points are mapped to a 2D plane. This is done using 3D projection, and, for some applications, perspective projection. In one embodiment, parallel projection is used to obtain the 2D image, in which lines of projection are parallel both in reality and in the projection plane. As a result, texture image (I) is obtained from such 3D projection of the vertices (S). FIG. 3 shows illustrative images used in an example process for color-based geometric feature enhancement. Image 310 shows an example 2D image obtained by parallel projection of the selected portion of the 3D mesh.

In some embodiments, pixels of the 2D image are obtained based on flat lighting to reduce shadows on the image. When projecting a scanned 3D mesh to a 2D image through 3D projection (e.g., parallel projection), certain faces may result in an edge due to different illumination on them during the 3D scanning process. This can often happen, for example, for faces that are in the shadow or are more prominently illuminated than their neighbors. Such faces will result in a strong edge in the 2D image, e.g., under most standard edge detection algorithms, but such faces should not be considered as features that need to be enhanced. In various embodiments, this issue is mitigated by using flat lighting while obtaining the pixels for the image to avoid shadows. Further, besides using flat lighting to mitigate illumination artifacts, as will be discussed in more detail in connection with block 230, vertices associated with edges that are related to an existing relief feature are protected from unnecessary modifications.

Next, at block 220, a plurality of pixels associated with an edge in the 2D image are detected, e.g., by detection module 120 of FIG. 1. At a high level, edge detection uses mathematical methods to identify pixels in the 2D image where the image brightness has discontinuities. In some embodiments, the 2D image is blurred to reduce noise, such as to mitigate the interference of minor artifacts. As an example, image 320 in FIG. 3 represents a blurred image obtained using bilateral filters.

In some embodiments, a second-order edge detection (e.g., Laplacian) is applied to the image to detect edges. In one embodiment, detection module 120 identifies an edge strength value of a pixel of the image, e.g., as in Eq. 1, and associates the pixel with an edge in response to the edge strength value greater than an edge strength threshold, e.g., as in Eq. 2. In Eq. 1, E is the set of edge strength values of respective pixels in the image, and in Eq. 2, Et is the set of remaining pixels whose edge strength values are greater than the edge strength threshold. In some embodiments, E or Et is a set of pairs wherein each pair includes a pixel and its edge strength value.

$$E = \text{Laplacian}(\text{BilateralFilter}(I)) \quad \text{Eq. 1}$$

$$Et = \text{Threshold}(E) \quad \text{Eq. 2}$$

The edge strength threshold may be predetermined or selected based on the 3D model type or 2D image type. The edge strength threshold may be dynamically determined based on the general image brightness of the image or the relative image brightness of a localized portion of the image. The edge strength value of a pixel can also be saved, e.g., to be used later by enhancement module 130 in connection with block 230 in determining the displacement value for those vertices in the 3D model associated with the pixel in the 2D image. As an example, image 330 in FIG. 3 shows an edge image obtained from Laplacian, where edges are associated with those white features.

Further, 3D coordinates of respective points in the 3D model that correspond to each pixel in (Et) are obtained, e.g., using any suitable un-project mechanism. Let us denote (P) as the set of the corresponding points (represented by 3D coordinates) in the 3D model that correspond to each edge pixel in (Et), as in Eq. 3.

$$P = \text{Un-project}(Et) \quad \text{Eq. 3}$$

Next, at block 230, geometric contrast of some vertices on the part of the 3D model affected by the points in (P) are enhanced, e.g., by enhancement module 130 of FIG. 1. First, the neighboring vertices (N) to each point in (P) are obtained, e.g., by identifying vertices that lie within a radius (R) of each point in (P) based on the kd-tree (T). The neighboring vertices (N) then become candidates to be enhanced. Second, the displacement value and the displacement direction are decided for each candidate vertex.

In various embodiments, the displacement value to a vertex in (N) positively correlates to the edge strength value of the related pixel in (Et) based on the chain relationship among (Et), (P), and (N), as discussed herein. Meanwhile, the displacement value to a vertex in (N) negatively correlates to a distance between the vertex and its related point in (P). By way of example, a weight can be assigned to each vertex in (N) based on Eq. 4.

$$W(n) \propto (\text{gradient}(p)/(\text{distance}(n,p)^2)) \quad \text{Eq. 4}$$

In Eq. 4, $p \in P$, $n \in N$, gradient ( ) is the strength of the edge strength value (as stored in E or Et) at the pixel related to point p, and distance (n, p) is the Euclidean distance between the vertex n, and its related point p in (P). In some embodiments, based on the constant of proportionality in Eq. 4, W(n) can be scaled to lie between 0 and 1.

In various embodiments, the displacement value to a vertex in (N) is also correlated to the angle of the surface normals of incident faces for the vertex in (N). Generally, the greater the angle of the normals of incident faces for the vertex, the harder would the displacement related weight of W(n) be penalized. In one embodiment, cosine-inverse of a dot-product of two normalized vectors ($f_i$ and $f_j$ with a unit length) is used to measure the angle between the two normalized vectors ($f_i$, $f_j$) of faces incident on n (F), as in Eq. 5. Further, W(n) is penalized, e.g., as in Eq. 6.

$$D = \{\cos^{-1}(\text{dot}(f_i, f_j)), \forall f_i, f_j \in F\} \quad \text{Eq. 5}$$

$$W(n) = (W(n)/W'), \text{ if } \exists d_i \in D | d_i \geq \text{threshold}(D)) \quad \text{Eq. 6}$$

As in Eq. 6, W' is a constant penalty factor, and threshold (D) corresponds to a small angle, e.g., like 10 degrees. For angles less than the threshold (D), e.g., two normals with the same orientation, the corresponding W(n) remains unchanged, i.e., is not penalized. In general, this penalization process is useful to identify those relief features on the part of the 3D model and heavily penalize the potential changes to those vertices that are located on an existing relief feature.

Enhancement module 130 further adjusts the maximum displacement (M) for each vertex in (N). In some embodiments, the maximum displacement is half the local mean edge length from the vertex, so that the faces adjacent to the vertex do not occlude faces on other adjacent vertices. In some embodiments, M is computed only on the vertices corresponding to the boundary pixels of the edges, and then the minimum value is used for all the vertices in (N).

Figure 4:
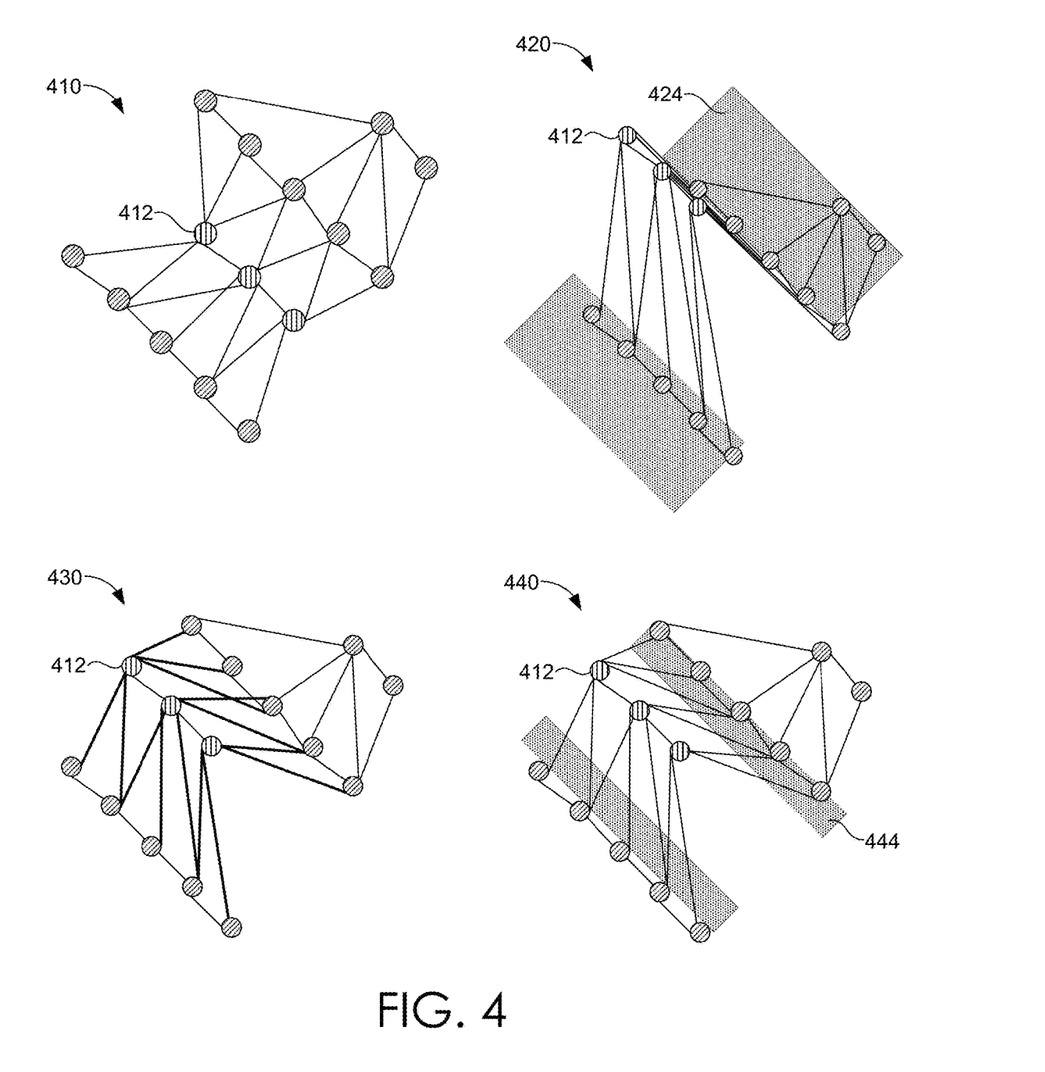
FIG. 4 depicts illustrative images showing the effects of displacement of vertices, in accordance with various embodiments of the present disclosure.

FIG. 4 depicts illustrative images showing the effects of displacement of vertices related to the maximum displacement (M) for a vertex. In image 410, edge vertex 412 is to be displaced with its maximum displacement (M). In image 420, when edge vertex 412 is displaced with a large maximum displacement (M), then it can result in occlusion 424 (e.g., extended shadows), which occludes faces on other adjacent vertices. In image 430, when edge vertex 412 is displaced with a moderate maximum displacement (M), then this moderate displacement only creates a smaller shadow region 444 and does not result in any occlusion, as shown in image 440. In this case, the moderate maximum displacement (M) is computed from the minimum of the edge lengths of any edges (from non-edge vertices) incident on any of the edge vertices.

Referring back to FIG. 2, once a suitable maximum displacement (M) is determined for each vertex in (N), each vertex is enhanced accordingly. In some embodiments, each vertex in (N) is translated along its vertex normal by a distance proportional to the corresponding (normalized) weights in (W), e.g., the displacement is W(n)×M(n). With appropriate geometric feature enhancement, the fine details, such as embroidered features in image 340 of FIG. 3, now have enhanced geometry, which will be shown in 3D printing. After process 200, vertex color information is translated to enhanced geometry of this 3D mesh.

Sparse meshes (or equivalently for sparse selection) are special cases for color-based geometric feature enhancement. As an example, if the selection contains less than one vertex per pixel of the image, it is usually difficult to obtain a good relief feature. In such a case, triangles in the selected region are subdivided into co-planar triangles. In order to avoid very thin triangles, the whole region can be re-triangulated (e.g., Delaunay Triangulation). Vertices of the new triangles are assigned color values. Since the process deals with vertex colors only, Barycentric interpolation is employed in some embodiments to assign colors to the triangles. The rest of the process for color-based geometric feature enhancement is the same as discussed herein.

Further, when enhancing a 3D mesh by deformation, self-intersection of triangles may result. This may render the mesh non-manifold and therefore not 3D printable. Advantageously, process 200 as disclosed herein restricts the deformation to along the normals of the vertices, and further displacements are applied only to faces with nearly parallel normals based on the penalization process to W(n) as discussed herein. Therefore, process 200 may not yield any self-intersection of triangles.

Even further, sharp relief features do not print well in 3D printing, and may simply break off in printing or post-processing. Advantageously, process 200 as disclosed herein provides gradual edges when creating new relief features. This is achieved in part based on the square-distance falling off effect for updating weights W(n), e.g., in Eq. 4.

Figure 5:
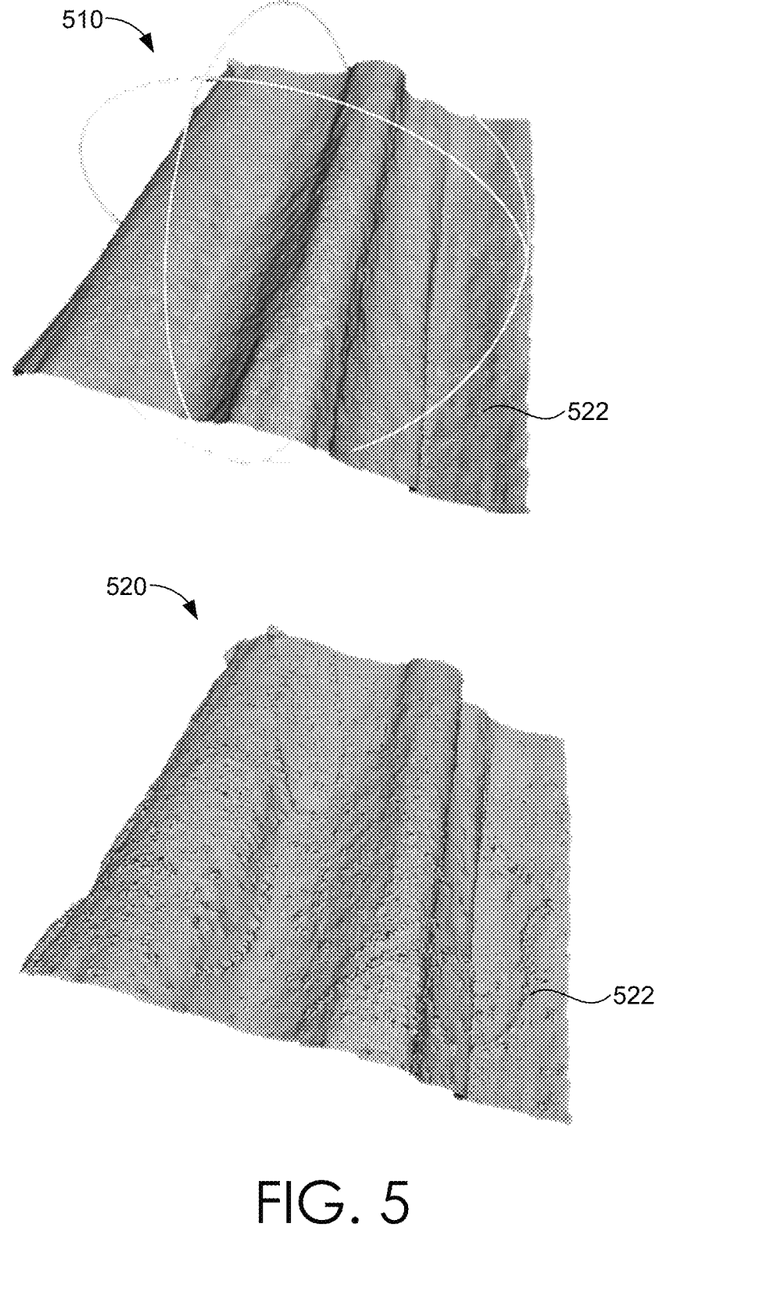
FIG. 5 depicts illustrative images showing the effects of color-based geometric feature enhancement, in accordance with various embodiments of the present disclosure.

As illustrated in FIG. 5, illustrative images show the effects of color-based geometric feature enhancement. Without any geometric feature enhancement, fine details, such as the embroidered feature 522 on object 510, are presented as relief features. However, after the application of color-based geometric feature enhancement, e.g., by system 100 or after process 200, the embroidered feature 522 on object 520 is provided with enhanced geometry. Advantageously, vertex color information is employed in this embodiment to enhance geometry of this 3D mesh.

Having briefly described an overview of embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 620, one or more processors 630, one or more presentation components 640, input/output (I/O) ports 650, input/output (I/O) components 660, and an illustrative power supply 670. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 620 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 620 or I/O components 660. Presentation component(s) 640 present data indications to a user or other device. Exemplary presentation components include a display device, speaker, printing component, vibrating component, etc.

In various embodiments, memory 620 includes, in particular, temporal and persistent copies of geometric feature enhancement logic 622. Geometric feature enhancement logic 622 includes instructions that, when executed by one or more processors 630, result in computing device 600 to perform color-based geometric feature enhancement on 3D models, such as, but not limited to, process 200. In various embodiments, geometric feature enhancement logic 622 includes instructions that, when executed by processors 630, result in computing device 600 performing various functions associated with, but not limited to, communication module 110, detection module 120, enhancement module 130, and data module 140 in connection with FIG. 1.

In some embodiments, one or more processors 630 may be packaged together with geometric feature enhancement logic 622. In some embodiments, one or more processors 630 may be packaged together with geometric feature enhancement logic 622 to form a System in Package (SiP). In some embodiments, one or more processors 630 can be integrated on the same die with geometric feature enhancement logic 622. In some embodiments, processors 630 can be integrated on the same die with geometric feature enhancement logic 622 to form a System on Chip (SoC).

I/O ports 650 allow computing device 600 to be logically coupled to other devices including I/O components 660, some of which may be built in. Illustrative components include a microphone, joystick, game pad, satellite dish, scanner, printer, wireless device, etc. The I/O components 660 can also provide a natural user interface (NUI) that processes air gestures, voice, or other physiological inputs generated by a user. In some embodiments, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A computer-implemented method, comprising:
projecting a part of a 3D model into a 2D space to form an image;
detecting a plurality of pixels associated with an edge in the image based on vertex color information of the part of the 3D model; and
enhancing geometric contrast of vertices on the part of the 3D model associated with the plurality of pixels in the image by displacing a plurality of vertices on the part of the 3D model, the plurality of vertices being associated with the plurality of pixels in the image.

2. The method of claim 1, further comprising:
identifying an edge strength value of a pixel of the image; and
associating the pixel with the edge in response to the edge strength value being greater than an edge strength threshold.

3. The method of claim 2, further comprising:
obtaining 3D coordinates of a point in the 3D model corresponding to the pixel.

4. The method of claim 3, further comprising:
obtaining neighboring vertices within a radius of the point in the 3D model; and
adding the neighboring vertices to the plurality of vertices to be enhanced.

5. The method of claim 4, further comprising: assigning a displacement value to at least one of the neighboring vertices based on a positive correlation between the displacement value and an edge strength value of the pixel of the plurality of pixels.

6. The method of claim 4, wherein the enhancing comprises assigning a displacement value to at least one of the neighboring vertices based on a negative correlation between the displacement value and a distance between the at least one of the neighboring vertices and the point in the 3D model.

7. The method of claim 4, wherein the enhancing comprises assigning a displacement value to at least one of the neighboring vertices based on a negative correlation between the displacement value and an angle between normals of incident faces for the at least one of the neighboring vertices in the 3D model.

8. The method of claim 4, wherein the enhancing comprises limiting a displacement value of at least one of the neighboring vertices so that a displacement of the at least one of the neighboring vertices based on the displacement value does not occlude faces of adjacent vertices of the at least one of the neighboring vertices.

9. A system, comprising:
a processor; and
a computer-readable medium communicatively coupled to the processor, wherein the processor is configured for executing instructions stored in the computer-readable medium and thereby performing operations comprising:
receiving a user input indicative of an region of a 3D model selected by a user;
projecting the region of the 3D model into a 2D space to form an image;
detecting a plurality of pixels associated with an edge in the image based on vertex color information of the region of the 3D model; and
enhancing geometric contrast of vertices on the region of the 3D model associated with the plurality of pixels in the image by displacing a plurality of vertices on the region of the 3D model, the plurality of vertices being associated with the edge in the image.

10. The system of claim 9, wherein the operations further comprising: associating a pixel of the image with the edge in response to an edge strength value of the pixel greater than an edge strength threshold.

11. The system of claim 10, wherein the operations further comprising:
obtaining 3D coordinates of a point in the 3D model corresponding to the pixel associated with the edge;
identifying neighboring vertices within a radius of the point in the 3D model; and
assigning a displacement value to at least one of the neighboring vertices based on a positive correlation between the displacement value and the edge strength value of the pixel of the plurality of pixels and a negative correlation between the displacement value and a distance between the at least one of the neighboring vertices and the point in the 3D model.

12. The system of claim 11, wherein the operations further comprising: displacing the at least one of the neighboring vertices along a normal of the at least one of the neighboring vertices based on the displacement value.

13. The system of claim 9, wherein the operations further comprising: identifying a relief feature on the region of the 3D model, and prevent one or more vertices among the plurality of vertices that are located on the relief feature from being changed.

14. One or more non-transient computer storage media storing computer-readable instructions that, when executed by one or more processors of a computer system, cause the computer system to perform operations comprising:
constructing an image based on a first plurality of vertices of a region at a 3D model selected by a user;
applying a second order edge detection tool to the image to detect a plurality of pixels associated with an edge in the image;
obtaining a second plurality of vertices of the 3D model affected by the plurality of pixels associated with the edge;
filtering out a third plurality of vertices of an existing relief feature from the second plurality of vertices to generate a remaining fourth plurality of vertices; and
enhancing geometric contrast by displacing the remaining fourth plurality of vertices.

15. The storage media of claim 14, wherein the instructions further cause the one or more computing devices to perform operations comprising:
selecting the region of the 3D model based on an area under a sculpting brush;
obtaining pixels for the image based on a flat lighting tool to reduce shadows on the image; and
blurring the image to reduce noise.

16. The storage media of claim 14, wherein the instructions further cause the one or more computing devices to perform operations comprising:
identifying the existing relief feature on the part of the 3D model; and
mitigating displacement for one or more vertices among the remaining fourth plurality of vertices that are associated with the relief feature.

17. The storage media of claim 14, wherein the instructions further cause the one or more computing devices to perform operations comprising:

sub-dividing a triangle in the region into co-planar triangles;
re-triangulating the region based on a Delaunay triangulation; and
assigning colors to a plurality of triangles formed after the Delaunay triangulation based on a Barycentric interpolation.

18. The storage media of claim 14, wherein the instructions further cause the one or more computing devices to perform operations comprising:
identifying an edge strength value of a pixel of the image, and
associating the pixel with the edge in response to the edge strength value greater than an edge strength threshold.

19. The storage media of claim 14, wherein the instructions further cause the one or more computing devices to perform operations comprising:
obtaining 3D coordinates of a point in the 3D model corresponding to a pixel of the plurality of pixels associated with the edge in the image; and
assigning a displacement value to one of the remaining fourth plurality of vertices based on a negative correlation between the displacement value and a square-distance between the one of the remaining fourth plurality of vertices and the point in the 3D model.

20. The storage media of claim 19, wherein the instructions further cause the one or more computing devices to perform operations comprising:
displacing the one of the remaining fourth plurality of vertices along a normal of the one of the remaining fourth plurality of vertices based on the displacement value.

* * * * *